United States Patent Office 3,475,321
Patented Oct. 28, 1969

3,475,321
SOLVENT DEWAXING WITH A SYNERGISTIC WAX CRYSTAL MODIFIER COMPOSITION
Richard O. Henselman, North Plainfield, and Harold N. Miller, Plainfield, N.J., assignors to Esso Research and Engineering Company, a corporation of Delaware
No Drawing. Filed Nov. 14, 1966, Ser. No. 593,630
Int. Cl. C10g 43/06
U.S. Cl. 208—33       3 Claims

ABSTRACT OF THE DISCLOSURE

Solvent dewaxing with a synergistic dewaxing aid of a vinyl ester and chlorinated war-naphthalene Friedel Crafts condensation product mixture.

---

This invention relates to a novel wax crystal modifier composition and to the utilization of same, and more particularly to a dewaxing aid comprising a combination of additives which synergistically improve the separation of waxes from petroleum oils. The invention especially relates to petroleum oil compositions comprising wax-naphthalene condensates and certain vinyl ester polymers.

Various methods are known in the art for separating wax from petroleum oil. One such method, for instance, is chilling the waxy oil and filtering off the solid wax. One of the most popular ways of dewaxing oils is known as solvent dewaxing. This comprises diluting the oil with a solvent, heating until complete solution is obtained, and then chilling until the desired amount of wax crystals thus formed are separated from the slurry by means of filtration. The wax is then further purified, while the solvent is recovered for reuse and the dewaxed oil is sent to other refinery processes.

Although such solvent dewaxing has largely replaced other processes for the separation of wax from hydrocarbon oils, filtration of the wax crystals from the slurry formed during dewaxing is difficult and often the filtration rate of the slurry limits the capacity of the entire process. The slurry filtration rate is determined primarily by the size and shape of the wax crystals formed during the chilling step of the process. Very fine crystals tend to clog the filter media rapidly, reducing the filtration rate and eventually necessitating shutdown of the filters for removal of the accumulated wax. Very large crystals tend to form gel-like interlocking masses which do not form a compact filter cake, which contain a large amount of oil and solvent, and which are difficult to wash. As a solution to this problem, it has become the practice in the art to incorporate in the wax-containing petroleum oil materials which modify the size and shape of wax crystals in such a manner as to permit more rapid separation of the wax during dewaxing operations. These materials are known as dewaxing aids. For example, it has been known for some time that Friedel-Crafts condensation products of halogenated paraffins and aromatic hydrocarbons are effective dewaxing aids for wax-containing petroleum oils. However, the continued need for more efficient petroleum dewaxing processes has raised the requirements of dewaxing and filtering aids. The provision of new and more efficient dewaxing aids is, therefore, of great importance to the petroleum art.

It has now been found, in accordance with this invention, that by incorporating in a petroleum oil, as dewaxing aids, the combination of (a) a conventional wax crystal modifier made by the Friedel-Crafts reaction, i.e., a condensation product of a halogenated paraffin with an aromatic hydrocarbon and (b) a polymeric vinyl ester of organic acids containing at least 12 carbon atoms in the acid chain, a synergistic improvement in the wax crystal characteristics of the oil over that provided by the incorporation of either of these two types of additives alone is obtained. It is, therefore, the primary object of this invention to provide a new and highly improved class of wax crystal modifier compositions. Other and further objects of the invention will become apparent from the following detailed description thereof.

The present invention contemplates the employment of any conventional wax crystal modifier (e.g., pour depressant, dewaxing aid, etc.) made by the Friedel-Crafts condensation of a halogenated (i.e., chlorinated, brominated, etc.) paraffin with an aromatic hydrocarbon. The halogenated paraffin may, for example, contain from about 8 to about 60 carbon atoms, preferably from about 16 to about 44, and from about 5 to about 25 wt. percent chlorine, preferably from about 10 to about 18 wt. percent. Typically, the halogenated paraffins used to prepare by chlorinating to the above recited chlorine content a paraffin wax having a melting point within the range between about 105° and 190° F. The aromatic hydrocarbon used herein contains a maximum of three substituent groups and/or condensed rings and may be a hydroxy compound such as phenol, cresol, xylenol, or an amine such as aniline, but is preferably naphthalene, phenanthrene or anthracene. The Friedel-Crafts condensation products of the instant invention are prepared in accordance with well-known techniques, e.g., British Patents 511,207 and 562,714.

The second general component of this invention comprises a polymer obtained from long chain vinyl esters. In general, these polymers contain the following repeating structural units:

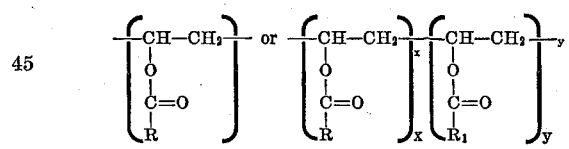

or mixtures thereof wherein R is a hydrocarbon radical containing a substantially linear alkyl side chain of at least 11 carbon atoms, $R_1$ is a lower hydrocarbon radical (e.g., a $C_1$-$C_6$ alkyl or aryl, such as, methyl, ethyl, butyl, and phenyl) and $x$ and $y$ are integers, the value of which depend on the mole percent of long chain ester and short chain ester employed in the polymerization reaction, and also on the molecular weight of the polymer. In essence, R may be branched or unbranched and may contain cyclic structures but there should be a linear alkyl chain containing at least 11 carbon atoms, e.g., R may be a phenyl group containing a $C_{20}$ alkyl substituent. It is preferred, however, that R be a linear alkyl containing from 12 to 24 atoms, although alkyls containing up to 30 carbon atoms are suitable.

The polymeric vinyl ester useful in this invention may be a homopolymer or a heteropolymer derived from a mixture of monomers. It is possible to have copolymerization in the formation of the esters of this invention, and these copolymers provide equally satisfactory results provided certain requirements as hereinafter discussed are met.

In essence, the polymeric vinyl esters useful in this invention are prepared from short chain vinyl esters of $C_2$–$C_6$ organic acids and/or long chain vinyl esters of $C_{12}$–$C_{24}$ organic acids. Examples of the short chain esters include vinyl acetate, vinyl propionate, vinyl butyrate, vinyl pivalate, vinyl pentanoate, vinyl hexanoate, vinyl benzoate, and the like. Examples of effective long chain esters include, among others, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behenate, vinyl tetracosanoate, vinyl 2-methyltetradecanoate, and the like.

Since the methods of polymerizing the vinyl esters to form polymers thereof is immaterial in the formation of the polymers described herein, any of the numerous processes available can be used therefor. For example, the vinyl esters may be dissolved in a suitable solvent and subsequently contacted with a peroxide-type catalyst at a temperature within the range between about 100° and about 350° F. for a period of a few minutes to several hours or more. The polymerization is generally conducted in the presence of a suitable inert solvent such as, for example, methylene chloride, methylene dichloride, chloroform, benzene, toluene, xylene, cyclohexane, normal heptane, ethyl ether, dioxane and the like. The peroxide catalyst may be any of these well-known type of catalysts such as benzoyl peroxide, ditertiary butyl peroxide, tertiary butyl hydroperoxide, diacetyl peroxide, diethyl peroxycarbonate, cumene hydroperoxide and the like. The amount of the catalyst added may vary over a considerable range. In general, the amount of the catalyst added will vary from about 0.1% to 5% by weight of the material being polymerized. Preferred amounts vary from 0.2%–1.2% by weight.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressures may be employed. At the end of the polymerization, the unreacted monomer and solvents are removed by any suitable means, such as distillation, extraction and the like.

The ester polymers and copolymers which are operable in the concept of this invention have a number average molecular weight in the range from about 1,500 to about 40,000 or higher, i.e., the upper range is limited only by the polymer oil solubility. It is preferred, however, that the molecular weight be within the range between about 2,000 and 25,000. The amount of long chain esters present in the copolymer as compared to the amount of short chain esters present is in the range from about 10 to about 90 mole percent, the preferred range being from 40 to 80 mole percent long chain esters.

The synergistic wax crystal modifier composition of this invention comprises from about 1 to about 99 wt. percent by weight of the aforedescribed Friedel-Crafts condensation product and from about 99 to about 1 wt. percent of the aforedescribed polymeric esters. Particularly preferred proportions are admixtures comprising from about 85 to about 15 wt. percent of the Friedel-Crafts condensation product and from about 15 to about 85 wt. percent of the polymeric ester.

While the products of this invention may be utilized to separate wax from a number of petroleum stocks, such as residua, middle distillates and the like, it has special application to waxy lubricating oil fractions. These fractions generally range in boiling points from about 400° to about 900° F. and contain from about 5 to about 20 wt. percent wax.

The synergistic wax crystal modifier composition of this invention may be blended directly with the aforedescribed wax-containing petroleum oils. Concentrations within the range of from about .005 to about 5.0 percent by weight based on the weight of the wax-containing oil, will be operable and will give the desired improvements in flow and wax separation characteristics. Based on economic reasons, from about 0.01 to about 0.5 wt. percent of the synergistic wax crystal modifier composition is preferably employed.

Particularly, desirable results are obtained when the wax crystal modifiers of the present invention are utilized in the conventional solvent dewaxing processes. For example, admixtures of the wax crystal modifier composition, dewaxing solvent and wax-containing oil may be processed by chilling the said admixture in any suitable manner to a wax precipitation temperature. The precipitated wax may then be removed by centrifugation or filtration, preferably the latter. Dewaxing operations are preferably conducted at a temperature within the range of about −40° to about +20° F. and, more preferably, at a temperature within the range of about −30° to about +5° F.

In the dewaxing processes, the amount of materials admixed will vary widely depending upon the particular dewaxing solvent used, as well as the type of petroleum oil being dewaxed. In general, it has been found that solvent dewaxing feeds comprising the hereinbefore specified amount of wax crystal modifier, from about 50 to about 90 wt. percent of the dewaxing solvent and from about 10 to about 50 wt. percent of the wax-containing petroleum oil can be easily and efficiently filtered in conventional dewaxing filtration equipment. Non-limiting examples of suitable dewaxing solvents include benzene, toluene, acetone, methylethyl ketone, propane, hexane, ethylene dichloride, aliphatic alcohols, naphtha, the like and mixtures thereof.

Various methods may be used to effect the blending of the wax crystal modifier composition, the wax-containing oil, and the dewaxing solvent, where used. For example, the wax crystal modifier composition and the wax-containing petroleum oil may be combined prior to the addition of a dewaxing solvent or alternately, the dewaxing solvent can be admixed with the oil prior to the addition of the wax crystal modifier. Broadly, an admixing temperature of about 120° to about 250° F. may be used. It is preferred, however, that the temperature be from about 160° to about 200° F.

The wax crystal modifier composition of this invention is found to be compatible with other additive materials and may be blended successfully with petroleum oils containing minor amounts of viscosity index improvers, rust inhibitors, lubricity agents, oxidation inhibitors and the like.

For ease in handling, the synergistic mixture of this invention may be utilized in a concentrated form. For example, to facilitate storage and transportation, the aforedescribed synergistic mixture may be blended with a hydrocarbon solvent, e.g., a mineral oil etc., to form a concentrate comprising from about 20 to about 80 wt. percent hydrocarbon solvent, preferably 40–60 wt. percent, and from about 20 to about 80 wt. percent of the synergistic mixture, preferably 40–60 wt. percent.

The invention can be more fully understood by reference to the following examples.

EXAMPLE 1

*Preparation of polyvinyl stearate.*—In this example, 40 ml. of toluene (solvent) and 0.4 gram of VAZO catalyst were charged into a stirred 250 ml. 3-neck flask and reacted for a period of about 4 hours at a temperature of about 200° F. The polymer product was isolated by distilling off the unreacted materials at elevated temperatures and reduced pressures. Unreacted monomer was removed by dialysis and 23.3 g. of polymer was recovered. The resulting product was a white, brittle solid having a number average molecular weight of about 11,000.

EXAMPLE 2

The following example illustrates the synergistic effect between a conventional Friedel-Crafts condensate (i.e., a condensation product of 4 moles chlorinated 125° F. M.P. wax containing 12 wt. percent chlorine with 1 mole of naphthalene) and the polyvinyl stearate prepared in Example 1.

In this example, 0.015 wt. percent (based on weight of wax-containing oil) of the above-wax-naphthalene condensate and 0.015 wt. percent (based on weight of wax-containing oil) of the polyvinyl stearate prepared in Example 1 were admixed at 140° F. with a waxy lube oil having the properties shown in Table I and hereinafter referred to as "Test Oil A."

Table I.—Properties of "Test Oil A[1]"

Inspection:
| | |
|---|---|
| ASTM viscosity at 210° F., SUS | 51.9 |
| Boiling point range, ° F. | 482–900 |
| ASTM pour point, ° F. | ° F.+ 120 |
| ASTM gravity, ° API, 60/60° F. | 31.0 |
| Wax content, wt. percent | 14 |

[1] Light Intermediate Raffinate from Mid-Continent Crude.

The above additive mixture-test oil blend was dewaxed in a conventional solvent dewaxing process, i.e., the additive-oil blend was dewaxed by diluting with a solvent consisting of 57 wt. percent methylethyl ketone and 43 wt. percent toluene at a solvent/oil ratio of 3.5/1 and then chilling at the rate of 2° F. per minute from a feed temperature of 140° F. to a filter temperature of −10° F. The chilled mixture was then continuously filtered through a vacuum leaf filter at a pressure differential of 25 inches of mercury. The filtration cycle consisted of a filtration time of 33 seconds, a drying time of 10 seconds, a wash time of 22 seconds, and a final drying time of 17 seconds.

Other samples of "Test Oil A" were dewaxed in the same manner as above except that 0.03 wt. percent (based on weight of wax-containing oil) of each of the individual components of the above synergistic dewaxing aid admixture was added to a separate oil sample prior to chilling. The feed mixtures comprising 0.03 wt. percent of the individual dewaxing aids (i.e., wax-naphthalene condensate or the polyvinyl stearate) were then separately processed under the same dewaxing conditions as used in the aforedescribed operation wherein the synergistic dewaxing aid admixture was used.

The data obtained from the above respective dewaxing operations were as shown in Table II.

Table II.—Dewaxing "Test Oil A"

| Dewaxing aid used: | Filtration rate, gal./hr. ft.² |
|---|---|
| None | 24.2 |
| 0.03 wt. percent of wax-naphthalene condensate | 39.5 |
| 0.03 wt. percent of polyvinyl stearate | 39.0 |
| 0.03 wt. percent of 50/50 wt. mixture of wax-naphthalene condensate/polyvinyl stearate | 54.8 |

As will be apparent from an examination of the comparative data reported in Table II, the combination of the additive components of this invention impart a marked improvement over that which could be obtained by the use of an equivalent amount of either material alone.

EXAMPLE 3

In another test, 0.02 wt. percent (based on weight of wax-containing oil) of another Friedel-Crafts condensate (i.e., a condensation product of 4 moles of chlorinated 170° F. M.P. wax containing 12 wt. percent chlorine with 1 mole of naphthalene) and 0.02 wt. percent (based on weight of wax-containing oil) of the polyvinyl stearate prepared in Example 1 were admixed at 180° F. with a waxy lube oil having the properties shown in Table III and hereinafter referred to as "Test Oil B."

Table III.—Properties of "Test Oil B[1]"

Inspection:
| | |
|---|---|
| ASTM viscosity at 210° F., SUS | 135 |
| Boiling point range, ° F. | 400–900 |
| ASTM pour point, ° F. | 145 |
| ASTM gravity, ° API 60/60° F. | 27.1 |
| Wax content | 17 |

[1] Baton Rouge Bright Stock from East Mississippi Crude.

The above additive composition-test oil blend was also dewaxed in another conventional solvent dewaxing operation, i.e., the additive-oil blend was dewaxed by diluting with hexane at a hexane/oil ratio of 3.5/1 and then chilling at the rate of 2° F. per minute from a feed temperature of 145° F. to a filter temperature of −30° F. The chilled mixture was then continuously filtered through a vacuum leaf filter at a pressure differential of 20 inches of mercury. The filtration cycle consisted of a filtration time of 36 seconds, a drying time of 9 seconds, a wash time of 27 seconds and a final drying time of 18 seconds.

Other samples of "Test Oil B" were dewaxed in the same manner as above except that 0.04 wt. percent (based on weight of wax-containing oil) of each of the individual components of the dewaxing aid admixture was added to a separate oil sample prior to chilling. The feed mixtures comprising 0.04 wt. percent of the individual dewaxing aids (i.e., wax-naphthalene condensate or the polyvinyl stearate) were then separately processed under the same dewaxing conditions as used in the aforedescribed operation wherein the synergistic dewaxing aid admixture was used.

The data obtained from the above respective dewaxing operations were as shown in Table IV.

Table IV.—Dewaxing "Test Oil B"

| Dewaxing aid used: | Filtration rate, gal./hr. ft.² |
|---|---|
| None | 5.1 |
| 0.04 wt. percent of wax-naphthalene condensate | 17.6 |
| 0.04 wt. percent of polyvinyl stearate | 12.5 |
| 0.04 wt. percent of 50/50 wt. mixture of wax-naphthalene condensate/polyvinyl stearate | 21.3 |

From the data in Table IV, the synergistic effect provided by the combination of the wax-naphthalene condensate with the polyvinyl ester is evident. Thus, the combination of the additive components of this invention impart an improvement which is greater than that which could be obtained by the use of an equivalent amount of either material alone.

It is not intended that this invention be limited to the specific examples presented by way of illustration. The scope of the invention is limited only by the appended claims.

What is claimed is:

1. In a process for the solvent dewaxing of petroleum oil including mixing solvent with the oil, chilling the oil-solvent mixture to form solid wax crystals and removing said wax crystals by filtration, the improvement of incorporating into said oil prior to formation of wax crystals, about .01 to 0.5 wt. percent of a dewaxing aid comprising a synergistic mixture within the range of about 85 to 15 wt. percent of a pour depressant which is a Friedel-Crafts condensation product of a paraffin wax having a melting point of 105° to 190° F. chlorinated to within the range of 5 to 25 wt. percent chlorine, and naphthalene, and about 15 to 85 wt. percent of an oil-soluble polymer having a number average molecular weight within the range of about 1500 to 40,000 comprising a vinyl ester having the formula:

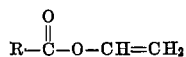

wherein R is a substantially linear $C_{12}$ to $C_{24}$ alkyl group.

2. In a process according to claim 1, said polymer being polyvinyl stearate.

3. In a process according to claim 2, said condensation product being the condensation product of about four moles of 125° F. melting point wax containing about 12 wt. percent chlorine condensed with about 1 mole of naphthalene and said polyvinyl stearate being a homopolymer of about 11,000 number average molecular weight.

References Cited

UNITED STATES PATENTS

| | | | |
|---|---|---|---|
| 2,760,996 | 8/1956 | De Vault | 208—33 |
| 2,960,468 | 11/1960 | Foehr et al. | 252—56 |
| 3,052,623 | 9/1962 | Edwards et al. | 208—33 |
| 3,239,445 | 3/1966 | Leonard et al. | 208—33 |
| 3,324,034 | 6/1967 | Merz et al. | 252—56 |

HERBERT LEVINE, Primary Examiner

U.S. Cl. X.R.

44—62; 252—56